Figure 1:
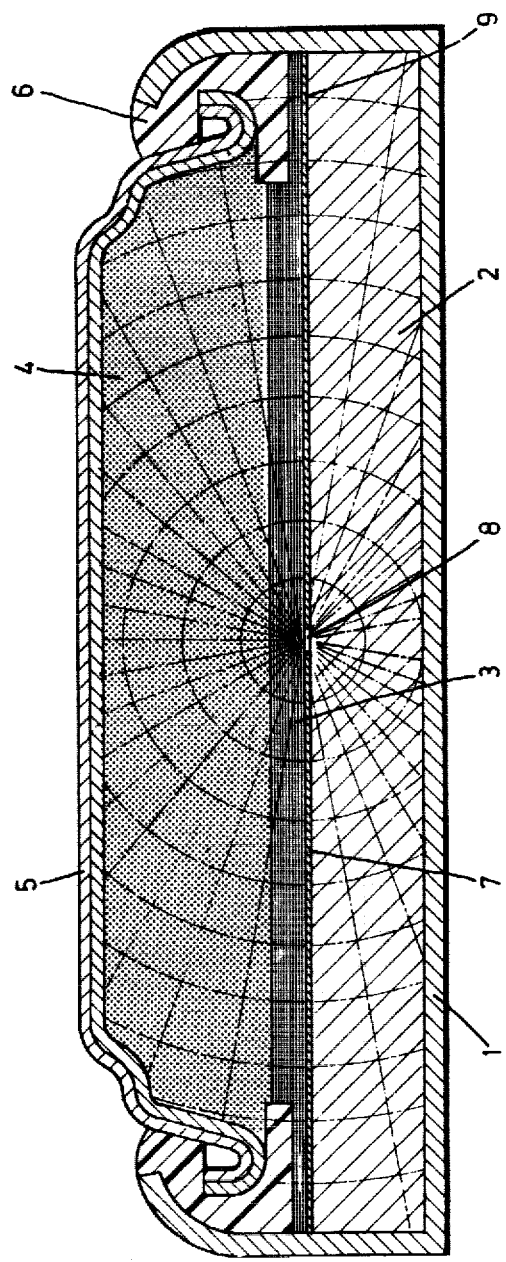

United States Patent [19]

Ruetschi

[11] 4,318,967
[45] Mar. 9, 1982

[54] LONG-LIFE GALVANIC PRIMARY CELL

[75] Inventor: Paul Ruetschi, Yverdon, Switzerland

[73] Assignee: Leclanche' S.A., Switzerland

[21] Appl. No.: 213,862

[22] Filed: Dec. 8, 1980

[30] Foreign Application Priority Data

Dec. 13, 1979 [CH] Switzerland ............... 11047/79

[51] Int. Cl.³ ........................................... H01M 2/18
[52] U.S. Cl. .................................. 429/48; 429/145; 429/125
[58] Field of Search ............ 429/144, 145, 125, 48, 429/247

[56] References Cited

U.S. PATENT DOCUMENTS 1,920,151 7/1933 Ruben ........................... 429/125
3,758,343 9/1973 Magritz ......................... 429/145

Primary Examiner—Donald L. Walton
Attorney, Agent, or Firm—Lockwood, Dewey, Alex & Cummings

[57] ABSTRACT

Disposed between the positive electrode and the negative electrode in addition to the separator layer is an electrolyte-impermeable inert film or foil about 5 to 50 microns thick. The film or foil includes a very small current-focusing aperture produced by piercing, punching, or melting. The entire electrolytic current is focused through this aperture. The area of the aperture is at least ten times smaller than the surface area of the separator layer. The thickness l of the film or foil and the radius $r_i$ of the aperture are governed by the relationship $4l/r_i \leq 10$. The electrolyte-impermeable film or foil is sealingly clamped between the positive electrode and a sealing ring at the edge of the cell. The film or foil may be of a synthetic resin polymer material, of nickel, or of a nickel alloy. Self-discharge is decreased by the construction of the cell. The cell may be in a flat form without any appreciable decrease in the energy density taking place. Furthermore, the cell presents advantages when electrolytes having a low freezing point are used. The cell is well suited as a power source for electronic watches, pacemakers, or as a voltage source for electronic memories.

7 Claims, 2 Drawing Figures

LONG-LIFE GALVANIC PRIMARY CELL

This invention relates to galvanic primary cells, and in particular to a galvanic primary cell of the type intended for low current loads and having long storage and service life. Cells of this type are used in applications where only minimal currents or current pulses are needed. They are suitable as power sources for electronic watches and for pacemakers, or as voltage sources for electronic memories.

Self-discharge is known to occur in galvanic primary cells both during long periods of storage and during use, owing to chemical or electrochemical side reactions which take place in addition to the actual current-supplying process. Particularly for cells intended for long service, it is important to eliminate or retard such self-discharge reactions to the greatest extent possible.

Depending upon the particular battery system, those skilled in the art use known means suitable for this purpose.

In alkaline primary cells having negative electrodes of zinc, the formation of hydrogen, for example, occurs as a self-discharge reaction:

$$Zn + H_2O \rightarrow ZnO + H_2 \qquad (1)$$

This reaction can be largely but not completely forestalled by careful amalgamation (cf. P. Ruetschi in *J. Electrochemical Society*, Vol. 114, 1967, p. 301).

A further self-discharge reaction is determined by the solubility of the active material (HgO or Ag$_2$O) of the positive electrode. The active material dissolved in the electrolyte diffuses through the separator layer to the negative zinc electrode where it is reduced, an equivalent amount of zinc being oxidized. In the case of a mercuric oxide electrode, this process may be formulated as follows:

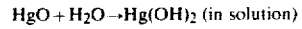

$$HgO + H_2O \rightarrow Hg(OH)_2 \text{ (in solution)}$$

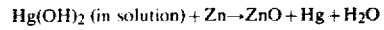

$$Hg(OH)_2 \text{ (in solution)} + Zn \rightarrow ZnO + Hg + H_2O$$

U.S. Pat. Nos. 4,136,236 and 4,192,914 describe an arrangement called a "filter electrode" intended to reduce self-discharge caused by the solubility of the positive active material. The filter electrode consists of a layer of electronically conductive, microporous material which covers the entire electrochemically active geometrical surface of the positive electrode facing the negative electrode and which retards the diffusion of active material dissolved in the electrolyte.

The filter electrode has proved to be a useful means of reducing self-discharge. It has the drawback, however, of having to be relatively thick in order to lessen effectively the diffusion of dissolved active material. This is a particular disadvantage when very flat cells are to be constructed, e.g., button cells. The filter electrode then takes up too much of the inner volume, thus causing a decrease in the energy density of the cell.

U.S. Pat. No. 4,172,183 teaches an arrangement for a long-life cell in which a manganese dioxide depolarizer layer, disposed against the separator layer, is intended to prevent the diffusion of dissolved active material (HgO or Ag$_2$O). However, this arrangement likewise has the disadvantage of lowering the energy density because manganese dioxide provides less capacity per unit volume than mercuric or silver oxide.

U.S. Pat. No. 4,209,584 discloses a "Long-Life Alkaline Primary Cell Having Low Water Content" exhibiting reduced self-discharge. It is based upon the discovery that at a very high electrolyte concentration, the diffusion of dissolved mercuric or silver oxide in the electrolyte decreases. By reducing the water content of the cell to an H$_2$O:NaOH ratio of less than 2.7, an H$_2$O:KOH ratio of less than 3.1, and an H$_2$O:RbOH ratio of less than 4, the self-discharge can be drastically lowered.

The only drawback of this procedure is that because of the high freezing point of the electrolyte, the internal resistance of the cell increases very sharply as the temperature decreases, thus leading to internal resistance values which, at 0° to $-10°$ C., are undesirably high for certain applications, such as in watches.

It is an object of this invention to provide an improved galvanic primary cell in which self-discharge is reduced by a factor of 10 or more as compared with conventional cells of this type but which does not exhibit the drawbacks associated with the arrangements discussed above.

To this end, in the galvanic primary cell according to the present invention, of the type initially mentioned, the improvement comprises a thin film or foil of inert material, impermeable to electrolyte, disposed between the positive electrode and the negative electrode, and including at least one current-focusing aperture, the area of the aperture being at least ten times smaller than the area of the film or foil, the thickness $l$ of the film or foil and the radius $r_i$ of the aperture conforming to the relationship $4l/r_i \leq 10$.

This arrangement does not lead to any appreciable decrease in the energy density of the cell. It also presents advantages when used with electrolytes having extremely low freezing points. Furthermore, it may be used together with the prior art designs discussed above.

Figure 2:
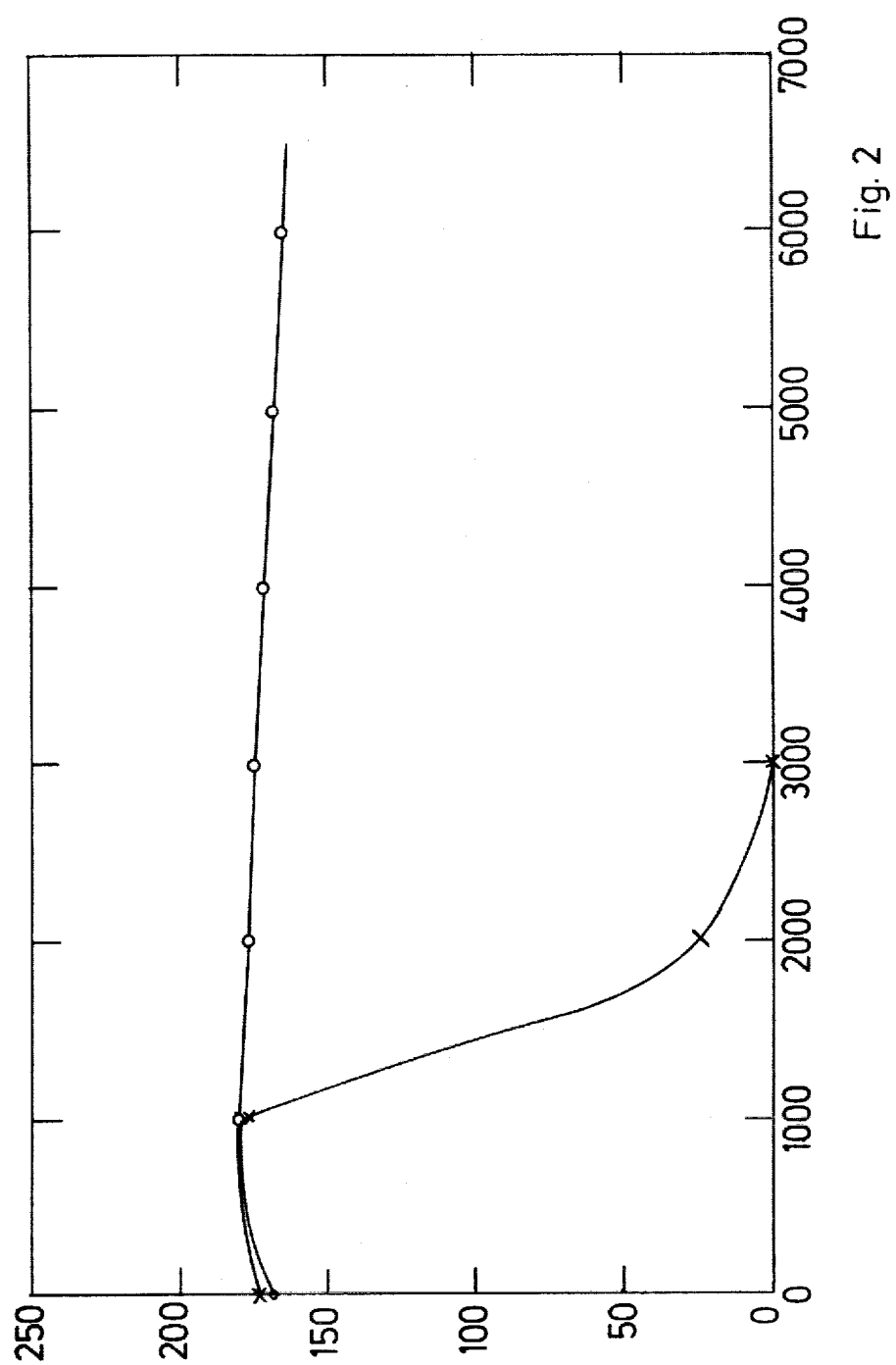

Other objects and advantages of the invention will become apparent from the following detailed description of a preferred embodiment, taken in conjunction with the accompanying drawings, in which:

FIG. 1 is a cross-section through a flat button cell according to the invention, and FIG. 2 is a graph showing capacity as a function of storage time.

FIG. 1 shows a very thin, inert film (or foil) 7, impermeable to electrolyte, disposed between a positive electrode 2 and a negative electrode 4, in addition to a separator layer 3, in a flat button cell. A very small, current-focusing aperture 8 has been produced in film 7 by piercing, punching, or melting. The entire electrolytic current is focused through aperture 8. Electrolyte-impermeable film 7 is as thin as possible. A thickness of 5–50 microns has proved suitable in practice. The lower limit of thickness is governed, for practical purposes, by the necessity of the film or foil having sufficient mechanical strength to withstand processing and remaining chemically intact and impermeable to electrolyte even after aging in the cell. Suitable film materials are plastics which are chemically resistant to the electrolyte contained in the cell and to substances dissolved therein. For many lithium primary cells having non-aqueous liquid electrolytes, as well as for alkaline primary cells, polypropylene and the synthetic resin polymer product sold under the registered trademark "Teflon" are examples of suitable film materials. Besides inert plastics, inert metals such as nickel and the nickel alloy sold under the registered trademark "Inconel" enter into consideration as foil materials.

As may be seen in FIG. 1, film 7 is sealingly gripped between positive electrode 2 and a sealing ring 6 at the edge 9 of the cell, thereby preventing any short-circuiting between electrodes 2 and 4 as a result of the movement of solid or liquid conductive particles around the edge of separator 3. Separator 3, in the form of an electrolyte-saturated nonwoven or felt, an electrolyte-saturated microporous membrane, or some other commercially available inert separator, is preferably inserted between film 7 with its current-focusing aperture 8 and positive electrode 2. Instead of or in addition to separator 3, a filter electrode as described in the aforementioned U.S. Pat. Nos. 4,136,236 and 4,192,914 may also be inserted. This step prevents positive active material from accumulating directly in front of the inlet opening of aperture 8.

The film or foil with its current-focusing aperture may advantageously be disposed between two commercially available separators, e.g., of polypropylene felt. In addition, further commercially available separators, e.g., of cellophane, may be disposed on the side of the separator layer facing the negative electrode.

The diameter of mechanically produced aperture 8 in film 7 may be adapted to the electrochemical system and the particular application. In general, the smallness of aperture 8 will be limited by the magnitude of the tolerable internal electric resistance.

The electrolyte resistance in the aperture is calculated according to the equation $$R_i = \frac{\rho \cdot l}{\pi \cdot r_i^2} \quad (3)$$

$\rho$ being the electrolyte resistivity ($\Omega$cm), l being the thickness of the film or roll (cm), and $r_i$ being the radius (cm) of the aperture.

The electrolyte resistance outside the aperture, based on the simple spherical model of FIG. 1, is calculated approximately according to the equation $$R_e = l \int_{r=r_i}^{r=r_e} \frac{d(r_e)}{4\pi r_e^2} = \frac{\rho}{4\pi r_i} - \frac{\rho}{4\pi r_e} \quad (4)$$

$r_e$ being the inside radius of the cell.

It is an essential aspect of the invention that the hindrance of diffusion of dissolved, positive active material is subject to laws analogous to those governing electric resistance. In order to achieve as great a relative hindrance of diffusion as possible by means of the aperture, the conditions must be such that even with a minimum film or foil thickness of l→O ($R_i$→O), diffusion is nonetheless sharply curbed, hence that $r_i$ must be much less than $r_e$, thus $R_e$ must be much greater than O.

This means in practice, for instance, about $r_i \leq \frac{1}{3} r_e$. The area of the aperture would then be, for instance, at least ten times smaller than the geometric surface area of the separator layer between the positive and negative electrodes.

It is a further essential aspect of the invention that the hinderance of diffusion in front of the aperture is not negligible relative to the hindrance in the aperture. This may be expressed by the condition:

$$R_i \leq 10 R_e \text{ or } \frac{4l}{r_i} \leq 10.$$

Therefore, for a film or foil thickness l of 0.005 cm (50 microns), for example, the radius $r_i$ selected from the aperture will be greater than 0.002 cm.

Despite the virtually complete separation of the cell into two almost completely isolated compartments, one each for the positive and negative electrodes, by means of the current-focusing film or foil—which may at first glance seem absurd—the total internal resistance of the cell remains within reasonable bounds if the film or foil is of only very slight thickness. Thus, for example, for a film or foil thickness of 0.005 cm (50 microns) and an aperture radius of 0.01 cm, with an electrolyte resistivity of 2 $\Omega$cm, the electrolyte resistance in the aperture works out to $R_i = 32\Omega$ and the electrolyte resistance outside the aperture to $R_e = 16\Omega$, thus the total resistance caused by the film or foil to 48$\Omega$.

The film or foil with current-focusing aperture utilized in the cell according to the present invention represents a very reproducible means of extending the average path of diffusion of the dissolved active material in the electrolyte. In contrast thereto, microporous membranes, which have been utilized previously as diffusion barriers, are technologically difficult to manufacture with reproducible diffusion properties.

Instead of a single aperture, a number of such apertures may naturally be made in the film or foil. The total area of the apertures would then have to be very much smaller than the area of the film or foil. Furthermore, the apertures would have to be distributed in such a way that at least on the side of the film or foil facing the positive electrode, non-negligible local differences in concentration of the dissolved, positive active material are formed on the film or foil surface. In other words, a higher external resistance $R_e$ should develop than in the case of a conventional microporous membrane with very many small pores uniformly distributed over the entire separator surface.

According to the present invention, the aperture may also be situated toward the edge of the cell.

The film or foil with current-focusing aperture comprised in the present invention can be used to advantage in all galvanic primary elements which have to supply only weak currents and in which the solubility of the positive active material leads to self-discharge processes, thus, for example, in alkaline primary cells as well as in various lithium cells.

The effectiveness of the invention will now be illustrated, taking as an example in alkaline primary cell having a positive electrode of mercuric oxide and a negative electrode of zinc powder. The test cells were constructed in button form according to FIG. 1, with a diameter of 11.6 mm and a height of 4.2 mm.

A cup 1 and a cover 5 were produced in a manner known per se, in accordance with U.S. Pat. No. 3,657,018. Negative electrode 4 consisted of amalgamated zinc powder (10.3% Hg) and positive electrode 2 of mercuric oxide with which graphite and manganese dioxide were admixed. Separator layer 3 consisted of a commercially available cotton nonwoven in contact with the zinc electrode, three cellophane films as sold by E. I. du Pont de Nemours & Co. under the trade name "Pudo 193," and a polypropylene felt. A number of cells were additionally provided with the film having a current-focusing aperture, disposed on the positive side of the separator layer between two polypropylene felts. This film was of the synthetic resin polymer product sold under the registered tademark "Teflon" and was 0.05 mm (50 microns) thick. The aperture was produced by piercing with a needle. The effective radius of the aperture was an estimated 0.05 mm. The electrolyte consisted of 49% potassium hydroxide.

Electrical data measured on the cells are compiled in Table 1.

TABLE 1

Electrical values measured at 20° C. of mercuric oxide-zinc cells, diameter 11.6 mm, height 4.2 mm

|  | Comparison cells without film having current-focusing aperture | Cells according to invention having current-focusing aperture |
| --- | --- | --- |
| Open-circuit voltage | 1.37 V | 1.37 V |
| Average voltage with 10Ω load after 3 sec. | 0.8 V | 0.03 V |
| Average internal resistance, measured at 40 c/s | 7Ω | 600Ω |

The cells according to the invention, by virtue of their nature, have a very much higher internal resistance.

For the purpose of accelerated aging and for determining the self-discharge, the cells were stored in a warming cupboard at 75° C. Cells were periodically removed from the warming cupboard and discharged at room temperature under a load of 10 KΩ. The results are shown in Table 2.

TABLE 2

| Storage time at 75° C. (hours) | Capacity (mAh) | |
| --- | --- | --- |
| | Comparison Cells | Cells According to Invention |
| 0 | 174 | 169 |
| 1000 | 177 | 180 |
| 2000 | 24 | 177 |
| 3000 | 0 | 175 |
| 4000 | 0 | 174 |
| 5000 | 0 | 167 |
| 6000 | 0 | 165 |

These results are plotted on the graph of FIG. 2. They demonstrate the extraordinary increase in storage life achieved by means of the film with current-focusing aperture according to the present invention. The self-discharge of the cells with aperture is only about 20 mAh, or 11% per year at 75° C. Thus, at room temperature, the self-discharge of the cells according to the invention is far less than 1% capacity loss per year. Hence these cells lend themselves to applications where a service life of 10-20 years is sought.

The result of Table 2 and FIG. 2 is all the more unexpected for those skilled in the art as it is known that during storage at high temperatures, self-discharge is brought about not only by the diffusion of dissolved mercuric oxide but also above all by the generation of hydrogen at the zinc electrode. A possible explanation for the result of Table 2 and FIG. 2 is that in cells without a film having a current-focusing aperture, the diffusion of dissolved mercuric oxide leads primarily to an oxidation of zinc according to reaction (2), but that thereafter, through the local oxidation of zinc on the surface of the electrode, during which $H_2O$ is also produced according to reaction (2), the zinc electrode then generates hydrogen "secondarily" according to reaction (1) and thereby undergoes additional self-discharge. In the presence of a film or foil having a current-focusing aperture, according to the invention, for less dissolved mercuric oxide diffuses to the zinc electrode, and consequently less "secondary" generation of hydrogen occurs there.

Therefore, in addition to the reduction of self-discharge through the hindrance of mercuric oxide diffusion by means of the current-focusing aperture, which reduction can be calculated on the basis of equations (3) and (4), it seems that even a further unexpected advantage is connected with the arrangement accordin to the present invention.

Finally, it is important to note that neither in comparison cells nor in cells according to the invention was any appreciable swelling of the cells due to an accumulation of hydrogen in the negative electrode observed, neither after storage at room temperature nor after hot storage at 75° C. In every case swelling remained below 0.1 mm. The very thin films used according to the invention are apparently permeable enough to gaseous hydrogen so that the latter can diffuse through to the positive electrode, where it is oxidized to water.

What is claimed is:

1. A galvanic primary cell of the type intended for low current loads and having long storage and service life, containing a positive electrode, a negative electrdoe, and an electrolyte, wherein the improvement comprises
a thin film or foil of inert material, impermeable to said electrolyte, disposed between said positive electrode and said negative electrode, and including at least one current-focusing aperture, the area of said aperture being at least ten times smaller than the area of said film or foil, the thickness $l$ of said film or foil and the radius $r_f$ of said aperture conforming to the relationship $4l/r_f \leq 10$.

2. The cell of claim 1, wherein said thickness $l$ is from 0.0005 to 0.005 cm.

3. The cell of claim 1, wherein said inert material is a plastic inert with respect to said electrolyte and to positive, active material dissolved therein.

4. The cell of claim 1, wherein said inert material is a metal inert with respect to said electrolyte and to positive, active material dissolved therein.

5. The cell of claim 1 taking the form of a flat button cell and further comprising at least one separator layer and a sealing ring, said separator layer and said film or foil together being firmly clamped at the edges thereof between said positive electrode and said sealing ring.

6. The cell of claim 5, wherein said film or foil lies upon the surface of said positive electrode.

7. The cell of claim 5 comprising two said separator layers, said film or foil being disposed between said two separator layers.

* * * * *